UNITED STATES PATENT OFFICE.

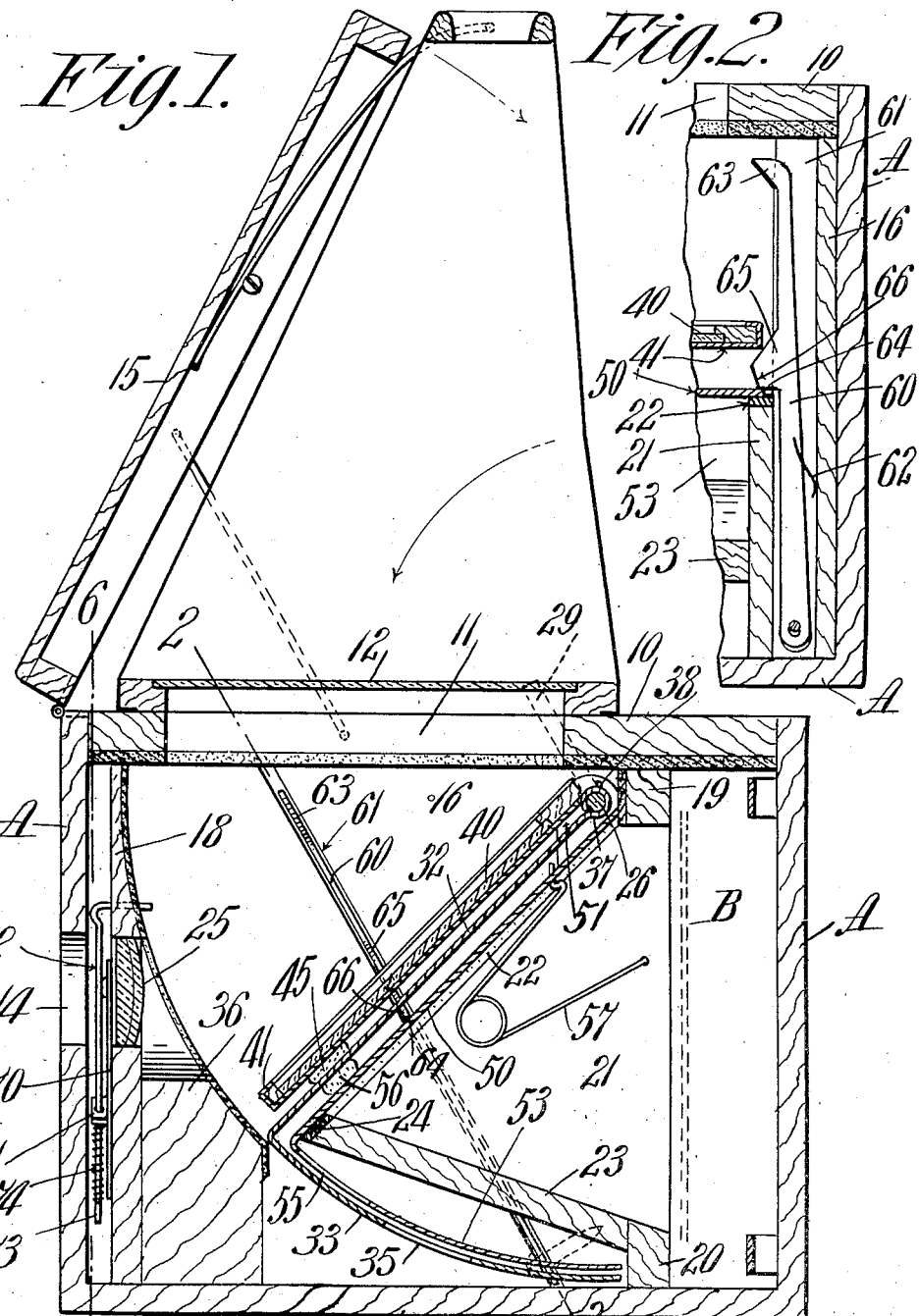

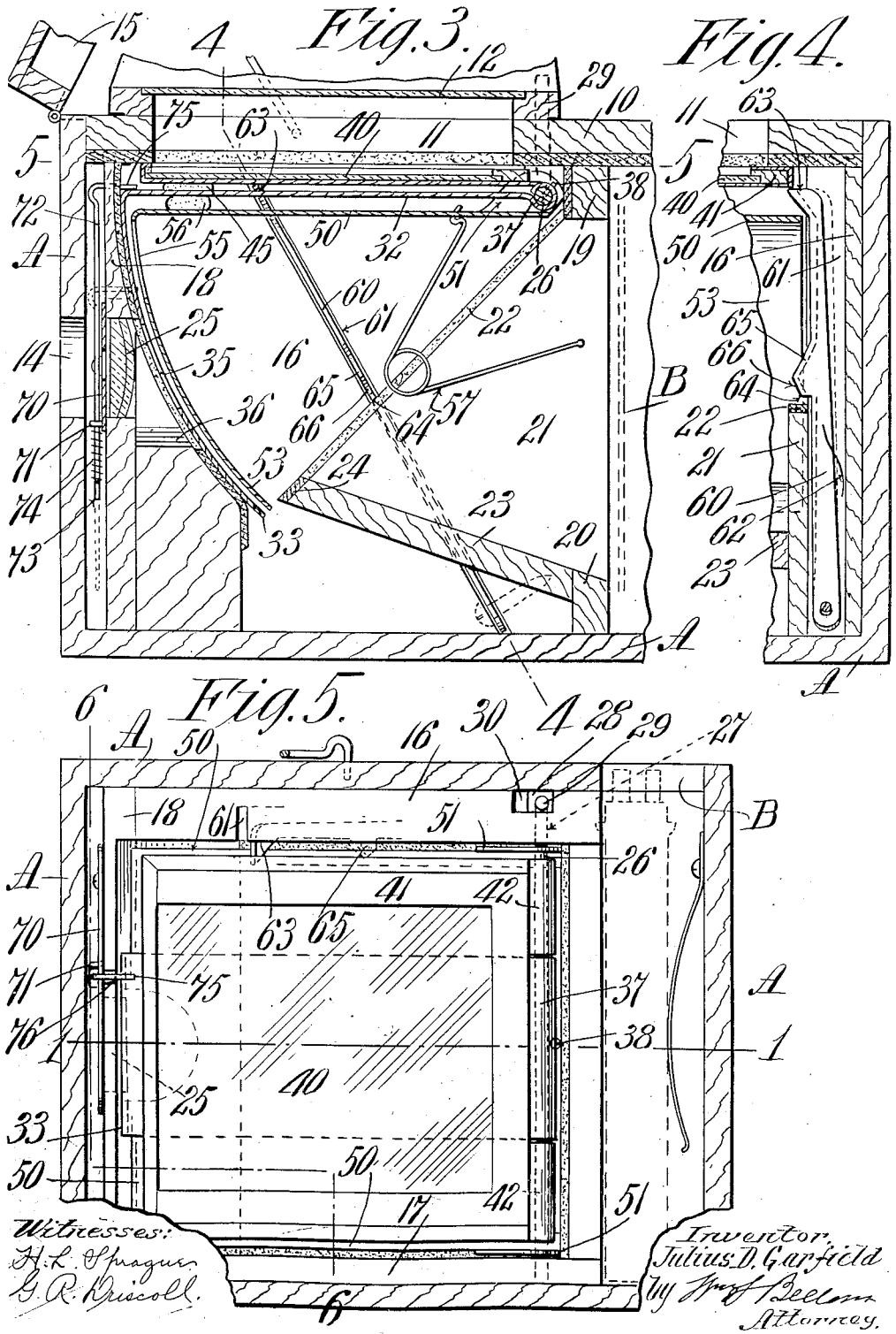

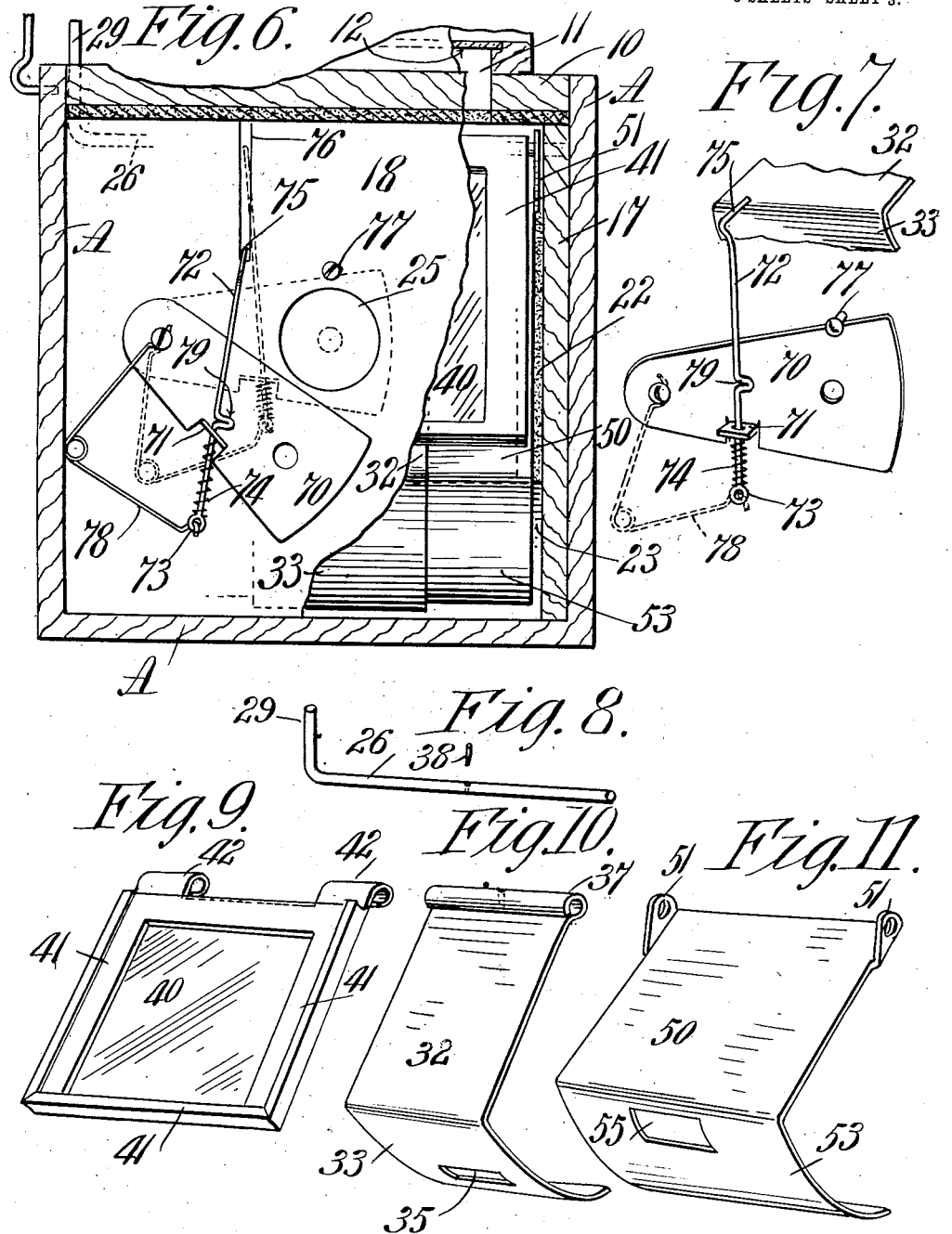

JULIUS D. GARFIELD, OF SPRINGFIELD, MASSACHUSETTS.

PHOTOGRAPHIC CAMERA.

No. 816,907.   Specification of Letters Patent.   Patented April 3, 1906.

Application filed December 1, 1905. Serial No. 289,812.

*To all whom it may concern:*

Be it known that I, JULIUS D. GARFIELD, a citizen of the United States of America, and a resident of Springfield, in the county of Hampden and State of Massachusetts, have invented certain new and useful Improvements in Photographic Cameras, of which the following is a full, clear, and exact description.

This invention relates to photographic cameras of the class known as "reflecting-cameras," and especially to such cameras in which the shutter thereof is in proximity to the lens as distinguished from the more common form of reflecting-cameras in which curtain-shutters adjacent the focal plane are employed.

The principal object of this invention is the provision of a light-excluding protector-plate which is operated in connection with a swinging mirror for the protection of uncovered photographic plates or films within the camera from extraneous light entering through the horizontal ground-glass screen during the upward movement of the mirror from its inclined or reflecting position to its horizontal and light-excluding position, as well as during the downward or setting movement of the mirror.

Another object of the invention is to provide in connection with a free swinging mirror and an independent free swinging but upwardly spring-actuated protector-plate a mirror and protector-plate actuator or lifter and an automatic double-acting latching device, whereby the mirror is locked in its upper and light-excluding position during the downward setting movement of the protector-plate and whereby the protector-plate is locked in its lower and light-excluding position during the upward movement of the mirror.

Other objects of the invention are attained by the provision of a lens-shutter as an appurtenance of the protector-plate, the provision of a coacting shield therefor formed on the actuating-lever or "lifter," and the lens stop or diaphragm, the positioning of which before the lens and the retiring of the same therefrom being controlled by the actuating-lever or lifter.

The invention consists in the arrangements or combinations of parts and the construction of certain of the parts, all substantially as hereinafter fully described, and set forth in the claims.

In the drawings, Figure 1 is a longitudinal vertical section through a camera embodying my improvements, the section being taken on a line 1 1, Fig. 5, and the position of the mirror and the parts coacting therewith shown as in the position they occupy for viewing the picture and as they are "set" previous to making an exposure. Fig. 2 is an obliquely vertical section taken through one side of the camera on a line 2 2, Fig. 1. Fig. 3 is a view similar to Fig. 1, but showing the mirror and coacting parts as in the position they normally occupy—that is, the position immediately following the making of an exposure. Fig. 4 is a view similar to Fig. 2, taken on a line 4 4, Fig. 3, which is the same plane of section as line 2 2, Fig. 1, but this view shows the same relations of the parts as Fig. 3. Fig. 5 is a plan view of the camera, the upper portion thereof above the line 5 5, Fig. 2, being shown as omitted. Fig. 6 is a sectional front elevation of the camera as taken on a line 6 6, Fig. 5. Fig. 7 is a perspective view of the stop or diaphragm I employ in this camera, together with a part coacting therewith for automatically bringing the same into operative position in front of the lens and for permitting the retiring of the same therefrom. Fig. 8 is a perspective view of the operating-shaft and handle-lever. Fig. 9 is a perspective view of the mirror and its frame and hinge portion. Fig. 10 is a perspective view of the lever-plate or lifter and the lens-shield formed thereon. Fig. 11 is a perspective view of the protector-plate and the lens-shutter formed thereon.

In the drawings, A represents the camera-box, the top board 10 of which has a rectangular opening 11 therein, above which is mounted in a suitable frame the hooded horizontal ground glass 12. An opening B in one side of and adjacent the rear end portion of the box A is provided for the insertion of a plate-holder or film-pack or may be of a size to properly receive a film-cartridge roll-holder. A lens-opening 14 is provided in the front end of the box A, and a suitable hinged cover 15, as shown in Fig. 1, may be provided to inclose the horizontal ground glass and its hood when the camera is not in use.

Within the box A is secured a skeleton frame consisting of two side boards 16 and 17, a front board 18, and the rear end uniting frame-bars 19 and 20. Each of the side boards 16 and 17 has formed thereon adjacent its rear end portions the angularshaped blocks 21, the forward upwardly-extending angles of which are cloth-covered and form ledges or seats 22. A transversely-arranged board 23, uniting the lower angular portions of the angular side blocks 21, extend from the frame-bar 20 forwardly and upwardly to the lower ends of the ledges 22. The forward end 24 of this board 23 is beveled to the angle of the ledges 22 and, like them, is covered with cloth, as is also the front face of the frame-bar 19. (See Figs. 1, 3, and 5.) A lens 25, preferably of the "universal focus" type, is mounted in the front board 18 at a point in line with the lens-opening 14 in the camera-box proper.

At a point just forward of the cloth-covered face of the frame-bar 19 and slightly above the upper end of the cloth-covered ledges 22 a transversely-extending rock-shaft 26 is supported in bearing-holes 27 in the side boards 16 and 17. (See Fig. 5.) The bearing-hole 27 in side board 16 has an upwardly-extending cut 28 leading therefrom, which accommodates the upturned lever portion 29 of shaft 26, and a continuation 30 of said recess or cut 28 is provided in the edge of the top board 10. (See Fig. 5.) The length of the lever 29 is such that its upwardly-bent free end projects slightly above the top surface of the top board 10, and the lengthwise extent of the cuts 28 and 30 is such as to admit of a sufficient forward and back movement of said lever to turn the shaft 26 about one-eighth of a revolution.

A plate-like lever 32 of a width considerably less than the internal width of the camera and having a straight or flat portion which is somewhat longer than the cloth-faced side ledges 22, is firmly pinned or otherwise secured to the central portion of the shaft 26 in the position illustrated in Figs. 1, 3, 5, and 6, and a downwardly-extending portion 33 is bent to a curve concentric with the shaft 26 and is of such a distance radially from said shaft as to slightly clear the rear face of the lens 25. The angle at which this shaft-carried lever-plate 32 or "lifter," as it will be called by reason of its having the function of elevating the mirror as well as other functions, extends relatively to the angle of the shaft-lever 29 is such that when the lever-plate is in its uppermost or horizontal position, as shown in Fig. 3, the free or handle end 29 of the shaft 26 is at its rearward extent of movement and vertical. A lens-opening 35, formed about centrally in the curved portion 33 of the lever-plate, is at this time, as shown in said Fig. 3, in alinement with the lens, and while the lever-plate is in this position to provide against any extraneous light coming into the camera except through the limited opening 35 the front board 18 is rearwardly reinforced by a curved built-out portion 36, the rear cloth-covered surface of which is of the same arc of curvature as the curved portion 33 of the lever-plate 32. The preferred means employed for attaching the lever-plate or lifter to the operating-shaft 26 is, as shown in the various views of the drawings, by means of a shaft encircling tubular portion 37, formed on the rear end of said lever-plate, which when correctly positioned on the shaft 26 is firmly secured thereto by a pin 38.

A swinging mirror 40, mounted in a suitable mirror-frame 41, is located immediately above the lifter 32 and is loosely hinge-supported on the shaft 26 by the tubular hinge projections 42 42 of the mirror-frame. (See Figs. 5 and 9.) The under side surface of the mirror-frame is provided with a felt cushion 45, which serves to maintain the mirror when in its extreme upper and lower positions in proper relationship to the lever-plate and to also deaden any sound which might be caused by the dropping of the mirror from its raised position to the lowered position of the lifter, as in Fig. 1.

Located below the lifter 32 is the protector-plate 50, which plate is also loosely hinge-supported on the shaft 26 by the bent-up perforated ears 51 51. This protector-plate is of a width equal to the distance between the side boards 16 and 17 and is flat and straight for a length equal to the length of the cloth-covered ledges 22 and is preferably made of a very thin and light sheet metal.

A downwardly-extending lens-shutter 53, formed integral with the protector-plate, is of a curvature concentric with the shaft 26 and of a radial distance therefrom slightly less than that of the curved portion 33 of the lever-plate 32.

A shutter-opening 55 is located adjacent the junction of the shutter portion 53 with the flat plate portion 50, all as clearly shown in Figs. 1, 3, and 11. A felt cushion 56, secured to the under side of lifter 32, tends to maintain the said plate in a parallel position to the protector-plate 50, as shown in Fig. 1. A spring 57, having one end anchored in the rear portion of one side wall of the camera and its free end engaging the protector-plate 50, exerts an upward force against the said plate.

An automatically-operating cam bar or lever 60 is pivotally supported within an obliquely upwardly extending groove 61 within the camera box or frame and is pressed from said groove toward the chamber in the box by its spring 62. (See Figs. 2 and 4.) The upper end portion of this cam-bar 60 is provided with a cam-shaped latch 63, the flat top edge portion of which normally supports the mirror-frame 41, as shown in Figs. 3 and 4.

An inverted cam-shaped latch 65, formed on the cam-bar 60 intermediately of its length and adjacent the ledge 22, is adapted to engage the protector-plate 50 and hold the same in its depressed position closely seated on the ledges 22 and against the upward pressure of spring 57 at the times when the mirror 40 is in its lower or reflecting position and also during the upward movement of said mirror and until the instant just previous to the latching of the same in its upward and light-excluding position. Immediately preceding the latching of the mirror to this last-described position, which position is illustrated in Figs. 3 and 4, the contacting edge of the mirror-frame 41 rides over the downwardly-inclined portion of the latch-cam 63 and forces the cam-bar 60 to the position shown in dotted lines in Fig. 4 against the compression of spring 62. This above-described action of the mirror-frame during its upward movement on the cam-bar 60 withdraws the flat bottom edge 64 of cam-latch 65 from above the engaged edge portion of the protector-plate 50, which results in a spring-impelled upward movement of the protector-plate. At the first upward impulse of the protector-plate, however, the contacting edge portion thereof encounters the slightly-angular cam-face 66 of the latch-cam 65 and acts to force the cam-bar 60 slightly farther back into its groove 61 than the upper cam-latch 63 had done. This is of little importance at this time, but is of essential importance during the operation of setting the mirror in its reflecting position, as will later be apparent.

Referring to Figs. 1, 3, and 5, and more especially to Figs. 6 and 7, a simple automatic means for stopping down the lens previous to making an instantaneous exposure is illustrated and consists of a stop or diaphragm plate 70, pivotally attached to the front board 18 in front of the lens 25. The bottom edge portion of this diaphragm-plate 70 has formed thereon the perforated bent-up lug 71, through which passes the lifting-rod 72, having the eye 73 formed on its lower end and a spring 74 interposed between said eye and the lug 71. The angularly-bent upper end 75 of this rod projects through and has a free vertical movement in a slot 76 in the front board 18, the end 75 being within the path of movement of the lever-plate 32, by which it is raised to the position shown in Fig. 3 on the raising of said plate. The distance to which the end 75 of the lifting-rod is raised by the lever-plate 32 is greater than the distance upwardly that the diaphragm 70 is permitted to be raised before it encounters the stop-pin 77, (see Fig. 6,) and the balance of the upward movement of the lifting-rod, succeeding the arresting of the upward movement of the diaphragm by the stop-pin, is made against the compression of the spring 74, to the end that a stationary and operative position of the diaphragm is maintained during the final upward movement of the lifter 32 and previous to the upward movement of the shutter 53. Immediately following the downward movement of the lifter 32 a downwardly-acting spring 78 draws the lifting-rod 72 downward and by the engagement of the bend 79 of said lifting-rod with the lug 71 moves the diaphragm to its lower position, thus giving a full opening to the lens 25, whereby a more brilliant reflection on the ground-glass screen is insured.

The operation of the camera to view the picture or subject and to subsequently make an instantaneous exposure is as follows: The camera-cover 15, which supports a suitable hood for the ground-glass screen, having been raised and the mirror and its coacting parts being in the position as illustrated in Fig. 3, the lever 29 is pressed forwardly, which rotates shaft 26 and carries the lifter 32, which is pinned to said shaft, downwardly to the position shown in Fig. 1. This downward movement of the lifter 32 carries the protector-plate 50, which is located thereunder, downward also until it reaches its set position and is locked therein by the cam-latch 65 against the upward pressure of the spring 57. Almost simultaneously with the locking in the set or light-excluding position of the protector-plate the passing of its contacting edge over the projecting point of the camera 65, just above the cam-face 66 thereof, retires the cam-bar 60 within its groove 61 and withdraws cam-latch 63 from its supporting position beneath the mirror and its frame 41, which being loosely hinged on shaft 26 drops by gravity to its reflecting position. (Shown in Fig. 1.) During the downward movement of the lifter 32, as first described, the shutter-opening 35, as a reference to Fig. 1 will show, is shielded by the upper portion of the curved portion 33 of said lever-plate from the entrance of light through the lens 25 into the camera. After viewing the picture as reflected on the ground-glass screen and being ready to make an instantaneous exposure the lever 29 is pressed rearwardly, which raises the mirror 40 by means of the lever-plate 32 to its upward and light-excluding position, where it is automatically locked by the latch-cam 63, the lens-opening 35 in the curved portion 33 of the lever-plate being at this time in position behind the lens and the diaphragm 70 being properly positioned in front of the lens. Instantly following the raising of the parts above described and synchronously with the upward locking of the mirror the light-weight protector-plate 50 is unlocked from its seated position on the ledges 22 and is quickly moved upwardly by its spring 57 and in so doing carries its shutter-opening 55 across the lens-opening 35 in the lever-plate and permits an exceedingly brief passage of light through the lens 25 to the uncovered photographic plate.

I claim—

1. In a photographic camera, a camera-box having a top opening, and a front lens-opening, a mirror adapted to swing to a horizontal position adjacent said top opening and to an inclined position behind the lens-opening, a protector-plate beneath the mirror, and adapted to have swinging movements similar to those of the mirror, latches for respectively automatically engaging and holding the mirror in its raised position, and the protector-plate in its lowered position, the mirror-latch being operative by its movement preparatory to engaging the raised mirror, to release the protector-plate latch, permitting the protector-plate to be then raised, and means for raising the protector-plate.

2. In a photographic camera, a camera-box having a top opening, and a front lens-opening, a mirror adapted to swing to a horizontal position adjacent said top opening and to an inclined position behind the lens-opening, a protector-plate beneath the mirror, and adapted to have swinging movements similar to those of the mirror, latches for respectively automatically engaging and holding the mirror in its raised position, and the protector-plate in its lowered position, the protector-plate latch being operative by its movement preparatory to engaging the lowered protector-plate, to release the mirror-latch, permitting the mirror to be then swung to its lowered position, and means for operating the protector-plate in both directions.

3. In a photographic camera, a camera-box having a top opening, and a front lens-opening, a mirror adapted to swing to a horizontal position adjacent said top opening and to an inclined position behind the lens-opening, a protector-plate beneath the mirror, and adapted to have swinging movements similar to those of the mirror, latches for respectively automatically engaging and holding the mirror in its raised position, and the protector-plate in its lowered position, the mirror-latch being operative by its movement preparatory to engaging the raised mirror, to release the protector-plate latch, permitting the protector-plate to be then raised, and the protector-plate latch being operative by its movement for engagement with the lowered protector-plate to release the mirror-latch from its engagement with the raised mirror.

4. In a photographic camera, a camera-box having a top opening and a lens-opening, a mirror adapted to swing to a horizontal position adjacent said top opening and to an inclined position behind the lens-opening, a lifter under the mirror, pivotally mounted for swinging movements, and means for imparting its swinging movements thereto, a protector-plate beneath the lifter, and adapted to have swinging movements similar to those of the mirror and lifter, latches for respectively automatically engaging and holding the mirror in its raised position and the protector-plate in its lowered position, the mirror-latch being operative by its movement preparatory to engaging the raised mirror to release the protector-plate latch, permitting the protector-plate to be then raised, and means for raising the protector plate.

5. In a photographic camera, a camera-box having a top opening, and a front lens-opening, a mirror pivotally mounted for swinging movements for assuming alternately a horizontal position adjacent said top opening, and an inclined position behind the lens-opening, a pivotally-mounted lifter, under the mirror, and a protector-plate beneath the lifter, said lifter and protector-plate being adapted to have swinging movements similar to those of the mirror, means for swinging the lifter in opposite directions for respectively positively raising the mirror, and for positively downwardly swinging the protector-plate, latches for respectively automatically engaging and holding the mirror in its raised position and the protector-plate in its lowered position, the mirror-latch being operative by its movement preparatory to engaging the raised mirror to release the protector-plate latch from its engagement with the protector-plate, and the protector-plate latch being adapted to cause by its movement for engagement with the lowered protector-plate a releasing of the other latch, leaving the mirror free to downwardly swing, and a spring operative to upwardly swing the protector-plate.

6. A camera-box having a top opening and a front lens-opening, a mirror adapted to swing to a horizontal position adjacent said top opening and to an inclined position behind the lens-opening, a lifter under the mirror, pivotally mounted for swinging movements, and means for imparting its swinging movements thereto, a protector-plate beneath the lifter, and adapted to have swinging movements similar to those of the mirror, a spring-pressed lever pivotally mounted within the side of the box having at upper and lower portions thereof latch members for respectively engaging and holding the mirror in its raised position and the protector-plate in its lowered position, the mirror-latch being operative by its movement preparatory to engaging the raised mirror to swing the said lever, thereby disengaging the protector-plate latch from the protector-plate, and means for exerting a raising force against the protector-plate.

7. A camera-box having a front lens-opening and a top opening, a horizontal rod in an upper part of the box behind the top opening, a mirror and a protector-plate pivotally hung on said rod and adapted to have swinging movements independently of each other, a spring-pressed lever pivoted within the side of the box and having at upper and lower portions thereof respectively a mirror-latch and a protector-plate latch, means for positively upwardly swinging the mirror, independently-operative means for exerting an upward force against the protector-plate, and means for downwardly swinging the protector-plate, said latches being arranged relatively to the course of movements of the mirror and protector-plate to alternately engage the one and release the other of said last-named parts.

8. A camera-box having a front lens-opening and a top opening, a horizontal rod, in an upper part of the box behind the top opening, and provided with an externally-accessible lever member, a mirror and a protector-plate both pivotally loosely hung on said rod and adapted to have swinging movements independently of each other, a lifter fixed to and adapted to have rocking movements in unison with said rod, and extending between and unattached relatively to both the mirror and the protector-plate, a spring-pressed lever pivoted within the side of the box and having at upper and lower portions thereof respectively a mirror-latch and a protector-plate latch, and a spring for exerting an upward force against the protector-plate, and said latches being arranged relatively to the course of movements of the mirror and protector-plate to alternately engage the one and release the other of said last-named parts.

9. A camera-box having a front lens-opening and a top opening, a mirror and a protector-plate pivotally mounted to have swinging movements, independently of each other, and said protector-plate having a curved depending apertured shutter at its portion toward the lens-opening, a spring-pressed lever pivoted within the side of the box and having at upper and lower portions thereof respectively a mirror-latch and a protector-plate latch, means for positively upwardly swinging the mirror, independent means for exerting an upward force against the protector-plate, and means for downwardly swinging the protector-plate, and said latches being arranged relatively to the course of movements of the mirror and protector-plate to alternately engage the one and release the other of said last-named parts.

10. In a photographic camera, a camera-box having a top opening and a lens-opening, and a diaphragm-stop, movable to a position opposite the lens-opening, a mirror adapted to swing to a horizontal position adjacent said top opening and to an inclined position behind the lens-opening, a lifter under the mirror, pivotally mounted for swinging movements, and means for imparting its swinging movements thereto, and said lifter coacting with said diaphragm-stop to bring the latter to its position opposite the lens-opening on the upward movements of such lifter, a protector-plate beneath the lifter, and adapted to have swinging movements similar to those of the mirror and lifter, latches for respectively automatically engaging and holding the mirror in its raised position and the protector-plate in its lowered position, the mirror-latch being operative by its movement preparatory to engaging the raised mirror to release the protector-plate latch, permitting the protector-plate to be then raised, and means for raising the protector-plate.

Signed by me at Springfield, Massachusetts, in presence of two subscribing witnesses.

JULIUS D. GARFIELD.

Witnesses:
 WM. S. BELLOWS,
 G. R. DRISCOLL.